United States Patent [19]

Hinsberg, III et al.

[11] Patent Number: 5,745,385
[45] Date of Patent: Apr. 28, 1998

[54] METHOD FOR STOCHASTIC AND DETERMINISTIC TIMEBASE CONTROL IN STOCHASTIC SIMULATIONS

[75] Inventors: William Dinan Hinsberg, III; Frances Anne Houle, both of Fremont, Calif.

[73] Assignee: International Business Machines Corproation, Armonk, N.Y.

[21] Appl. No.: 233,022

[22] Filed: Apr. 25, 1994

[51] Int. Cl.[6] ........................................... G06F 9/455
[52] U.S. Cl. ................................................. 364/578
[58] Field of Search ........................ 364/578, 148, 364/500, 501, 502, 503

[56] References Cited

U.S. PATENT DOCUMENTS

| | | | |
|---|---|---|---|
| 3,702,009 | 10/1972 | Baldwin, Jr. | 444/1 |
| 4,219,877 | 8/1980 | Vladimirov et al. | 364/554 |
| 4,383,757 | 5/1983 | Phillips | 355/53 |
| 4,513,384 | 4/1985 | Rosencwaig | 364/563 |
| 4,534,003 | 8/1985 | Manzione | 364/476 |
| 4,661,913 | 4/1987 | Wu et al. | 364/500 |
| 4,670,404 | 6/1987 | Swift et al. | 436/147 |
| 4,751,637 | 6/1988 | Catlin | 364/200 |
| 4,758,533 | 7/1988 | Magee et al. | 437/173 |
| 4,819,161 | 4/1989 | Konno et al. | 364/300 |
| 4,828,224 | 5/1989 | Crabb et al. | 251/298 |
| 4,841,479 | 6/1989 | Tsuji et al. | 364/900 |
| 4,908,784 | 3/1990 | Box et al. | 364/569 |

(List continued on next page.)

FOREIGN PATENT DOCUMENTS

| | | |
|---|---|---|
| 226964 | 11/1969 | U.S.S.R. |
| 458839 | 3/1975 | U.S.S.R. |
| 482733 | 12/1975 | U.S.S.R. |
| 498622 | 8/1976 | U.S.S.R. |
| 717776 | 2/1980 | U.S.S.R. |
| 721814 | 3/1980 | U.S.S.R. |
| 741297 | 6/1980 | U.S.S.R. |
| 868771 | 9/1981 | U.S.S.R. |
| 888115 | 12/1981 | U.S.S.R. |
| 960833 | 9/1982 | U.S.S.R. |
| 999063 | 2/1983 | U.S.S.R. |
| 062695 | 12/1983 | U.S.S.R. |

OTHER PUBLICATIONS

P. J. Haas and G. S. Shedler, Simulation Algorithm for Passage Times in Colored Stochastic Petrinets, IBM TDB vol. 35, No. 1A, Jun. 1992, pp. 186–188.

(List continued on next page.)

*Primary Examiner*—Kevin J. Teska
*Assistant Examiner*—Matthew Loppnow
*Attorney, Agent, or Firm*—James C. Pintner

[57] ABSTRACT

A system and method for simulating a mechanistic kinetic process, such as a chemical process including one or more chemical reactions, over a predetermined time period, subject to a programmed temperature variation, is provided. The simulation proceeds stochastically, by taking discrete time steps through the time period. The time steps vary in size, based on instantaneous reaction rate values for the reactions taking place. Reaction rates can vary by many orders of magnitude, and sometimes a stochastically calcualated time step will be so great that it might skip over a later increase in chemical activity. To avoid loss of accuracy and control of the simulation due to such excessively large time steps, when the stochastically determined time step exceeds a threshold, one or more smaller, deterministic time steps are made. The deterministic time steps "inch" forward in time, until an increase in chemical activity is detected. Then, stochastic time steps are resumed. In this manner, a simulation according to the invention detects and simulates the increase in activity. The invention more broadly covers any simulation over an interval of values for an independent state variable (e.g., time), where there are one or more programmed state variables (e.g., temperature, pressure, etc, expressed as a function of the independent state variable). Time steps are made based on a process parameter (related to the instantaneous reaction rates or probabilities of occurrence), whose value is related to a current system state related to the current programmed state variable values (e.g., temperature-dependent reaction rates).

30 Claims, 6 Drawing Sheets

U.S. PATENT DOCUMENTS

| | | | |
|---|---|---|---|
| 4,933,883 | 6/1990 | Pennebaker et al. | 364/554 |
| 4,935,882 | 6/1990 | Pennebaker et al. | 364/554 |
| 4,985,860 | 1/1991 | Vlach | 364/578 |
| 4,988,166 | 1/1991 | Cook | 350/321 |
| 5,019,998 | 5/1991 | Cowan et al. | 364/496 |
| 5,029,119 | 7/1991 | Konno | 364/578 |
| 5,079,731 | 1/1992 | Miller et al. | 364/578 |
| 5,081,601 | 1/1992 | Eirikasson | 364/578 |
| 5,157,620 | 10/1992 | Shaar | 364/578 |
| 5,202,843 | 4/1993 | Kunimine et al. | 364/578 |
| 5,257,206 | 10/1993 | Hanson | 364/502 |
| 5,394,322 | 2/1995 | Hanson | 364/148 |
| 5,446,828 | 8/1995 | Woodall | 395/23 |
| 5,459,675 | 10/1995 | Gross et al. | 364/492 |
| 5,486,996 | 1/1996 | Samad et al. | 364/152 |

OTHER PUBLICATIONS

C. Bianchi, G. Calzolari and P. Corsi, Stochastic Simulation: A Package for Monte Carlo Experiments on Econometric Models, IBM TDB vol. 20, No. 10, Mar. 1978, pp. 3972–3975.

K. A. Singmaster and F. A. Houle, Laser–Assisted Chemical Vapor Deposition from the Metal Hexacarbonyls, American Chemical Society, 203rd Nat. Meeting of American Chemical Society, San Francisco, CA Apr. 4–10, 1992.

G. Arthur Mihram, Simulation Statistical Foundations and Methodology, vol. 92 in Mathematics in Science and Engineering pp. 228–230, 1972.

N. T. J. Bailey, The elements of Stochastic Processes with Applications to the Natural Sciences, Chapter 7, Markov Processes in Continuous Time, pp. 66–69.

S. J. Lombardo and A. T. Bell, A Review of Theoretical Models of Adsorption, Diffusion, Desorption, and Reaction of Gases on Metal Surfaces, Surface Science Reports 13 (1991) 1–72 North Holland.

Hinsberg and Houle, MSIMPC v2.0: An Interactive Discrete Chemical Mechanism Simulator for the IBM PC (Laboratory and Classroom Version) IBM Research Report, 7814 (72196 11/8.90 Chemistry).

Bunker, Garrett, Kleindienst and Stevenson, Discrete Simulation Methods in Combustion Kinetics, Univ. of Calif. Irvine, Chemistry Dept. (paper).

Bunker and Houle MSIM4 — Discrete Simulator for Kinetic Mechanisms, Univ. of Calif. Irvine, Jul. 12, 1974 (paper).

Gillespie, Exact Stochastic Simulation of Coupled Chemical Reactions, Journal of Physical Chemistry, vol. 81, No. 25, 1977, pp. 2340–2361.

Gillespie, A General Method for Numerically Simulating the Stochastic Time Evolution of Coupled Chemical Reactions, Journal of Computational Physics vol. 22, No. 4, Dec. 1976, pp. 403–434.

Formosinho, Markov Chain Simulation of Chemical Reactions in Nonhomogeneous Systems, Journal of Chemical Education, vol. 49, No. 4, Apr. 1982.

Turner, Discrete Simulation Methods for Chemical Kinetics, Journal of Physical Chemistry, vol. 81, No. 25, 1977, pp. 2379–2408.

Breuer, Honerkamp and Petruccione, A Stochastic Approach to Complex Chemical Reactions, Chemical Physics Letters, vol. 190, No. 3,4, Mar. 6, 1992 pp. 199–201.

Bunker, Garrett, Kleindienst, Stevenson, Discrete Simulation Methods in Combustion Kinetics, Combustion Institue, Combustion and Flame 23, 373–379 (1974).

Hicks, Urbach, Plummer Dai, Can Pulsed Laser Excitation of Surfaces Be Described by a Thermal Model, Physical Review Letters, vol. 61, No. 22, 28 Nov. 1988, pp. 2588–2591.

Liarokapis and Raptis, Temperature Rise Induced by a CW Laser Beam Revisted, J. Appl. Phys. 47 (12), 15 Jun. 1985, pp. 5123–5126.

Barbero, Banon, Benito Santamaria, Stochastic Simulation Methods for Pollution Kinetics, Univ. Complutense, Madrid–3, 1984.

METHOD FOR STOCHASTIC AND DETERMINISTIC TIMEBASE CONTROL IN STOCHASTIC SIMULATIONS

FIELD OF THE INVENTION

The invention generally relates to the field of simulation of mechanistic kinetic processes, such as physical or chemical processes. More specifically, the invention relates to simulation of such processes, where a given input state variable, such as temperature, pressure, volume, concentration, or amounts of reactants or matter, is programmed to change according to a known time dependence, and the simulation involves doing system state calculations at selected points in time, as the programmed state variable changes.

BACKGROUND OF THE INVENTION

Certain types of simulators, which simulate processes such as chemical reactions, have operated by solving differential reaction-rate equations. See, for instance, the introductory portion of Gillespie, "Exact Stochastic Simulation of Coupled Chemical Reactions," Journal of Physical Chemistry, vol. 81, page 2340 (1977). Because such equations usually cannot be solved analytically, computerized numerical approximations have been used. However, such simulations are based on the not-always-realistic premises that the reactions are continuous and deterministic. First, computerized numerical solutions of such differential equations are inherently based on discrete points in time, rather than on a continuous time flow. Also, in the context of simulation through solution of such differential reaction rate equations, Gillespie describes "deterministic" as being an unrealistic condition, because molecular populations can only change by discrete integer amounts, and because the exact positions and velocities of the individual molecules, which must be taken into account for a fully deterministic analysis, are not available.

By contrast, stochastic simulators have been used to make discrete time simulations of chemical processes. Stochastic simulators operate by tracing a set of individual events which may occur over a time period during which the process is to be simulated. The simulators operate in a stepwise fashion, in terms of an independent state variable. The independent state variable is typically time, and the simulation operates over a given domain of values for the independent state variable, such as from an initial time to a conclusion time, or from an initial state at an initial time until a final state is reached.

The simulator makes a determination that each of the events has a certain probability of occurrence, which is determined by the system conditions and material properties, at any specific point of time. Typically, the probability is a function of the concentrations of the reactants, and of other factors such as temperature, pressure, etc. In a predefined time-window or interval, which is commonly referred to as a time step, any one of the simulated events may occur. There is, on the average, one occurrence of an event within a time step when the length of that time step is selected to be equivalent to the inverse of the total rate of occurrence of all events, such as the sum of reaction rates all chemical reactions in a mechanism being simulated. The likelihood of occurrence of certain event within that time step is proportional to the rate for that individual event.

A stochastic simulator commonly comprises at least one processor which is programmed to define a time step, based on the sum total of the reaction rates for all of the reactions being simulated, and then to randomly select one of those reactions, for which there will be an event which is to take place in that time step. The likelihood of an event being randomly selected is proportional to the probability of occurrence of the selected event, relative to that of the other events. As the consequence of the occurrence of the selected event, the processor updates the system conditions by use of material property tables, system process equations and other required data groups stored in at least one data storage apparatus. The system update may change the probabilities of occurrence of the events, resulting in a different total probability and a different time step. The processor then selects a new time step and repeats the event selection and system condition update processes, to propagate a system through the entire time span for system simulation.

A stochastic simulator was first used to simulate a spatially homogeneous chemical system where many chemical reactions occur (D. L. Bunker et al., Combustion and Flame, vol. 23, p. 373, 1974). Additional pioneering work was done by Bunker and Houle in "User's Manual: MSIM4—Discrete Simulator for Kinetic Mechanisms," Univ. of California, Irvine, Jul. 12, 1974, and by Hinsberg and Houle in "MSIMPC v2.0: An Interactive Discrete Chemical Mechanism Simulator for the IBM PC (Laboratory and Classroom Version)," IBM RJ 7814 (Nov. 8, 1990), to implement a simulator similar to that of Bunker and Houle for the IBM Personal Computer.

Another chemical simulator has been developed by Gillespie, wherein, for each stochastic time step, the simulator generates two random numbers, each between 0 and 1. The first random number is used for selecting a chemical reaction event which is to be simulated. The probabilities of all of the possible reactions are normalized from 0 to 1. Thus, the range from 0 to 1 is divided up into subintervals, each subinterval being assigned to one of the reactions, and having a size proportional to that reaction's probability. The first random number falls within the subinterval of one of the reactions. That reaction is selected as the event.

The second random number is used for properly weighting the time base used for time step determination. The reciprocal of the sum of the reaction rates, which is a time interval, is used to calculate a time step $\tau$ for the simulation, using a formula such as $$\tau = \frac{-\ln R}{\sum_j \text{rate}_j} \tag{1}$$

where $\text{rate}_j$ is the reaction rate of the j-th reaction of the simulation, and R is the second random number between 0 and 1. It will be seen that, for such stochastic simulations, time steps need not be uniform in size, or predictable. (Gillespie, "A General Method for Numerically Simulating the Stochastic Time Evolution of Coupled Chemical Reactions," Journal of Computational Physics, Vol. 22, No. 4, pp. 403–434, 1976). Better time base accuracy is achieved because the time step is dynamically weighted by the probability of occurrence for each individual event.

In both the Bunker and the Gillespie simulators, the probability for each possible reaction is determined from the rate of that reaction. The reaction probabilities may be thought of as normalized reaction rates, since the probability has a value ranging from 0 to 1. A reaction probability $P_i$ for an i-th reaction in a system in which j number of reactions are to take place, may be given by the expression $$P_i = \frac{\text{rate}_i}{\sum_j \text{rate}_j} \qquad (2)$$

where the $\text{rate}_i$ and $\text{rate}_j$ expressions are the non-normalized reaction rates.

The Gillespie and Bunker references used the terms "rate" and "probability" more or less interchangably. However, in the present specification, a rigorous distinction will be made between "rate" and "probability," to explain clearly how each relates to the stochastic simulations being described.

The reaction rates and probabilities may also be thought of as dependent state variables, since their values have a dependency, direct or indirect, on that of the independent state variable, time. That is, for a given simulation, the reaction rates are functions of conditions of the simulation, and these conditions may include one or more conditions which are programmed functions of time. For instance, for a given simulation, temperature may be a programmed function of time, and reaction rates are temperature dependent.

The reaction rates and the probabilities for the reactions are related to factors such as the populations of the reactants in the simulation volume. Also, the reaction rate for a given reaction may vary with the change of a programmed state variable, that is, a state variable whose value is some function of the independent state variable. For example, the temperature at which the simulation is to run may vary as a programmed, or otherwise specified, function of time. Thus, temperature would be a programmed state variable.

Suppose that temperature is the programmed state variable, and it is programmed to increase linearly over a specified time interval (time being the independent state variable) from an initial value to a final value. For a given reaction, the probability could increase by several orders of magnitude when some threshold temperature is reached. In such a situation, the time step size preferably should decrease correspondingly, as the simulation reaches that threshold temperature.

Conventional stochastic simulators using programmed variables work well for mechanisms in which the reaction probabilities do not vary too drastically with time, or with the changes in value of the programmed state variable. However, the correspondence between low reaction probabilities at a given state variable value and long time steps, given as per Equation 1, can lead to an operational drawback of conventional stochastic simulators. If a reaction probability decreases drastically, as a function of a small change in the value of a programmed state variable, then the simulation is likely to be poorly controlled. That is, a large time step might cover a region of time values during which shorter time steps would be necessary to accurately control the simulation. This loss of control cannot be predicted a priori, because it is not necessarily known where, within the range of values for the programmed variable, the chemically active regions are. In the worst case, a large increase in a reaction rate for a narrow temperature range, following a large preceding time step due to low reaction probabilities, could result in a period of significant chemical activity being entirely skipped over. Thus, this drawback significantly degrades the reliability of the simulation.

For conventional stochastic simulators, the only recourse is to determine where the regions of chemical activity are as a function of temperature, and to restrict the simulation to temperature regions where chemical activity (i.e., reaction probability) is stable and the program is well controlled. For a simulation where the reaction probabilities vary, the state variable's programmed variation must be divided into portions within which the rates are stable. Each portion is simulated separately, and the results are then pieced together. Performing a simulation in this fashion would be undesirably cumbersome and time-consuming.

SUMMARY OF THE INVENTION

It is therefore an object of the invention to overcome the above drawback by providing a method and system for performing mechanistic simulations which eliminates the problem of loss of accurate control where the dependent variable value changes abruptly and drastically, while avoiding the awkwardness resulting from the need to simulate a process portion by portion.

To achieve this and other objects, there is provided, in accordance with the invention, a method for performing stochastic simulation of a process over a domain of values for an independent state variable and over a corresponding range of values for a programmed state variable which is a function of the independent state variable, in terms of a sequence of values, within the domain, for the independent state variable; preferably, by a sequence of time steps through a time interval over which the simulation is to be run. A method according to the invention comprises the following steps.

First, a process state is calculated. The process state is given in terms of respective current values of at least one dependent state variable, the at least one dependent state variable being functions of the programmed state variable, based on a current value of the programmed state variable for a current value of the sequence for the independent state variable.

Then, a next value of the sequence for the independent state variable is selected, based on a first interval selection technique if a process parameter has a value within a predetermined range of values. Alternatively, a next value of the sequence for the independent state variable is selected based on a second interval selection technique if the process parameter has a value outside the predetermined range of values. The selection of the next value according to the above two alternative techniques may otherwise be described as follows. A first interval selection technique is a primary technique, and is used unless a condition requiring an alternative interval selection technique occurs.

While the above method steps are described and recited in general terms, because of their range of applicability, comprehension may be facilitated by describing them in terms of a particular, preferred application of the general method. In this preferred application, the independent state variable is time, and the process is to be simulated over a time interval, in terms of discrete time steps. Also, one preferred example of a programmed state variable is temperature. That is, the simulation is run using a preselected temperature dependency, the temperature dependency being given as a function of time over the time interval. For instance, during the interval temperature might increase linearly from an initial temperature to a final temperature. Finally, for chemical processes, the dependent variable or variables are preferably reaction rates for various chemical reactions which can take place in the system being simulated. With these concrete examples in mind, the three steps given above will be repeated here, with these concrete examples inserted in place of the general language previously used.

First, a process state is calculated. The process state is given in terms of respective current values for reaction rates of at least one chemical reaction, the reaction rates being functions of the temperature, based on a current temperature value for a current time value, the current time value being one of a sequence of discrete time values within a time interval over which a simulation is to take place.

Then, a next time value of the sequence is selected, based on a first interval selection technique if a process parameter has a value within a range of values. The range of values may be predetermined, provided by user input, dynamically calculated, etc. Alternatively, a next time value of the sequence is selected, based on a second interval selection technique if the process parameter has a value outside the predetermined range of values.

As will be discussed in detail below, the first, or primary, time value selection technique is a stochastic technique. When a time step is made according to a stochastic formula, such as that described above, a chemical reaction takes place in accordance with a conventional stochastic simulation process. The second, or alternative, time value selection technique is preferably a deterministic technique. In this context, "deterministic" means externally imposed. That is, the length of the deterministic time step is made in accordance with criteria other than just the present conditions of the system being simulated. For instance, if the simulation is running with a time-dependent programmed state variable such as temperature, a preferred deterministic time step is a time step corresponding with a temperature change which is less than or equal to some predetermined maximum temperature change. Thus, the deterministic time step would decrease in length as the programmed rate of temperature change increases. Alternatively, the deterministic time step can be a fixed length time step.

If, at a given point in time during the simulation, a deterministic time step is made, no chemical reaction is simulated, since the (shorter) deterministic time step does not let enough time elapse from the previous chemical reaction such that it is time for the next reaction yet. Successive deterministic time steps are made. After each deterministic time step, new reaction probabilities are calculated, based on the changed value of the programmed state variable. When the reaction rates increase because of changed conditions (such as a change on the programmed temperature), a new stochastic time step is calculated from the given point in time, based on the increased reaction rates detected after the deterministic time step. This new stochastic time step is based on higher reaction rates, and is therefore shorter, than would be the case if a stochastic time step had been made from the given point in time, using the reaction rates calculated from the system conditions at that given time.

Preferably, the simulator normally makes time steps based on the stochastic technique, and only uses the alternative, deterministic time-stepping technique when, based on the value of the process parameter, it appears that shorter time steps are necessary to maintain greater control over the simulation than the longer stochastic time steps would afford. That is, the stochastic and deterministic time step techniques are preferably considered to be primary and alternative techniques, respectively, rather than being considered equal alternative techniques.

In this concrete example, the process parameter is preferably related to the calculated reaction rates. For instance, in accordance with the known stochastic simulations described in the Background, the process parameter could be an overall reaction rate, given by the sum of the reaction rates for the various reactions of the system.

Also in accordance with the invention, the above steps are executed a series of times. Prior to the first execution, the time interval over which the simulation is to take place, and the temperature function for the time interval is also input. A time variable is set to the initial time value of the specified time interval. Then, the above set of steps is executed. If a time step as per the stochastic formula is made, then a chemical reaction is simulated as per the conventional stochastic simulation techniques. This results in a change in the system state, such as a change in reactant concentration or population. As a consequence, the next calculation of reaction probabilities reflects the system state change, as well as any change in programmed variable value. However, if a (shorter) deterministic time step is made, then no event is selected. Thus, when the next reaction probability values are calculated, they will be influenced by the change in the value of the programmed variable (temperature), but not by any result of chemical activity, such as a change in concentration or population of reactants.

When the time variable is updated based on the selected time step, based on whichever of the latter two steps is executed, a test is made to see if the end of the specified time interval is reached. If not, then the above set of steps is repeated, until the test indicates that the end of the interval has been reached.

While the invention is primarily disclosed as a method, it will be understood by a person of ordinary skill in the art that an apparatus, such as a conventional data processor, including a CPU, memory, IO, program storage, a connecting bus, and other appropriate components, could be programmed or otherwise designed to facilitate the practice of the method of the invention. Such a processor would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

Figure 1:
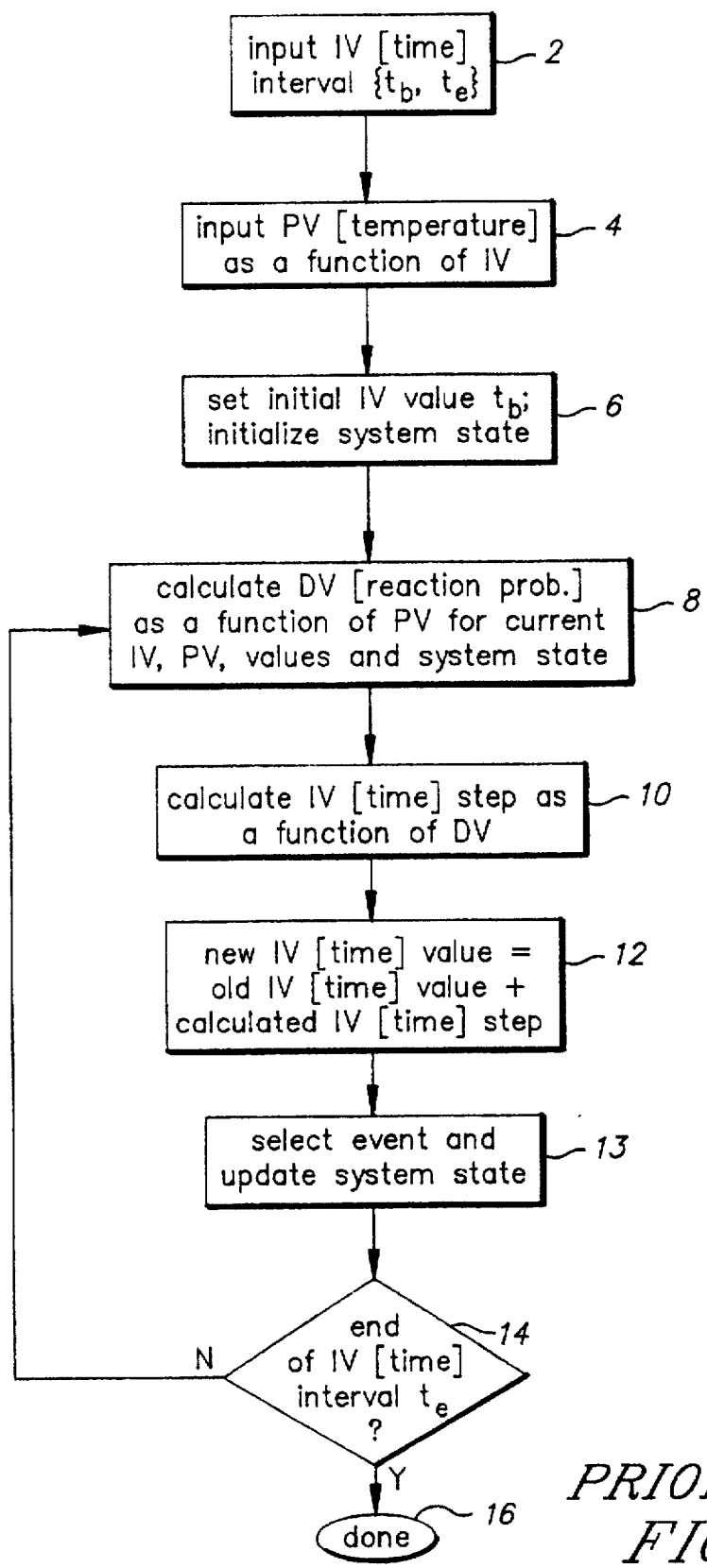
FIG. 1 is a flowchart of a simulation process employing a conventional stochastic simulation method.

As discussed in the Summary, the invention may be broadly described in terms of a process having generically named variables, or may be described in terms of a concrete example, to facilitate understanding. Throughout this disclosure, a preferred concrete example of a chemical process to be simulated over a given time interval, the temperature having a programmed time dependency, will be used, more or less interchangeably, with the generic language.

The independent state variable (e.g., time), the programmed state variable (e.g., temperature), and the dependent state variables (e.g., reaction probabilities) may be thought of as having a "paper, scissors, rock" relationship, since temperature is a function of time, the reaction probabilities are functions of temperature (among other things), and the time step used for the simulation is, for stochastic simulation, a function of the instantaneous reaction probabilities.

While this description should facilitate understanding, it is not intended as a limitation of the scope of the invention. For instance, while time is the preferred independent variable in the stochastic simulation techniques known to date, the process could be simulated over a range of temperatures, temperature being the independent variable, under a pressure which is a programmed function of the temperature.

The programmed state variable may be programmed in any manner suitable for the particular requirements of the simulation to be run. In the example, which will be discussed below, temperature increases linearly with time.

While temperature is a preferred programmed state variable, and is used for the illustrative examples described here, numerous other variables, such as pressure, volume, electric current, electromagnetic field, radiation or light, or injected quantities of reactants, catalysts, or other matter, could all be used as programmed state variables.

Also, while one independent variable (time), one programmed variable (temperature), and multiple dependent variables (probabilities for several different reactions), are given in the preferred example, there could alternatively be more than one programmed variables. For instance, temperature, pressure, or any of the other programmed variables listed above could both be programmed functions of the independent variable time.

Also, there could be only a single dependent variable. That is, instead of having reaction probabilities for multiple reactions, there could only be a single dependent state variable, such as a phase change probability for a single chemical substance which is the subject of the simulation.

For the purpose of describing the invention by example, it will be assumed that a chemical process is to be simulated, the chemical process having species A, B, C, and D. Three reactions can take place between these species. The three reactions, and expressions for calculating their reaction rates, which are directly proportional to their probabilities as per equation (1), are tabulated as follows:

TABLE 1

| REACTIONS | REACTION RATE FORMULAS |
|---|---|
| 1. A → B + C | $R_1 = k_1[A]$ |
| 2. B + 2C → A + C | $R_2 = k_2[B][C]^2$ |
| 3. A + C → D | $R_3 = k_3[A][C]$ |

In these reaction rate expressions, the k coefficients are reaction rate constants, whose values may be functions of programmed state variables, such as temperature. The concentration of a species is designated as that species enclosed in square brackets.

The reaction probabilities are proportional to the rates of the respective reactions within the population of reactants of the simulation, per unit time. The sum of the three rates is the total rate of any reaction taking place, per unit time. The reciprocal of that sum is the mean time during which any one of the reactions takes place. This mean time is used to calculate the time step used in stochastic simulation, preferably as per an equation such as equation (2).

A generalized formula for reaction rate R, reflecting the dependency on concentrations of reactant species $n_i$ and on a rate constant k, will be of the general form $$R = k[n_A]^x[n_B]^y \quad (3)$$

where k is a rate coefficient, $[n_i]$ are reactant concentrations, and x, y, etc., are constants, usually related to the stoichiometry of the reaction.

The reaction rate equations include the dependency on the programmed variable. For instance, where temperature T is the state variable programmed as a function of time, a generalized expression for the k coefficient of one of the equations of Table 1 is as follows:

$$k_i = C_i T^{\alpha_i} e^{-\frac{C'_i}{T}} \quad (4)$$

where $C_i$, $C'_i$, and $\alpha_i$ are constants for a given reaction step, T is the temperature, and $k_i$ is the rate constant for that reaction step.

As described above, numerous other variables can be used as programmed state variables. Reaction rates would then have dependencies in accordance with the particular programmed state variables used in the simulation, through the general form of the rate expression (equation 3). The following expressions may be used to calculate reaction rates as functions of the programmed state variables:

TABLE 2

| PROGRAMMED STATE VARIABLE | REACTION PROBABILITY EQUATION |
|---|---|
| Volume (V) | $[n_a] = \frac{n_A}{V}$ |
| Pressure (P) | V or $n_A$ or k |
| Temperature (T) | $k = AT^n e^{-\frac{E_a}{RT}}$ |
| Quantity of Reactant ($n_A$) | $n_A$ |
| Electric Current (i) | k(redox) = k(i,E) |
| Electromagnetic field (E) | k(diffusion) |
| Radiation (I) | $n^*_A = Ik[n_A]$ |

The equations in TABLE 2 will be recognizable or familiar to persons skilled in the chemical arts, who are familiar with the various types of variables which may be used to influence the course of chemical reactions. Therefore, they will not be elaborated upon in detail, except to define the variables. $n_A$ is the quantity of reactant species A, $[n_A]$ is the concentration of reactant species A, V is the volume within which the reaction is being simulated, k as a rate constant, T is the temperature, A is the Arrhenius pre-exponential factor, $E_A$ is the activation energy, R is the gas constant, i is an electric current, E is a voltage, and I is a radiation intensity. In the expression for temperature, the exponent n, to which T is raised, is a constant. The various programmed variables listed in TABLE 2 affect either the rate coefficient k or the concentration $[n_i]$ of one of the reactants $n_i$, as shown in equation 3.

FIG. 1 is a flowchart showing an example of a conventional, purely stochastic, simulation process. In initial steps 2, 4, and 6, the simulation process is initialized. The simulation is to be performed by a suitable computer or processing system. In steps 2, 4, and 6, the computer or processing system is initialized based on information, defining the simulation, which is input to the computer. Thus, the user defines the parameters under which the simulation is to be run.

In step 2, an independent state variable IV (for example, time) interval, over which the simulation is to be run, is input. An initial time $t_b$ and an ending time $t_e$ are specified as beginning and ending times of a time interval over which the simulation is to be run. For convenient illustration, the use of a fixed ending time $t_e$ will be described. However, in alternative applications, instead of an ending time, the simulation will run until a predetermined condition has been reached. For instance, a simulation might run until all of the initially provided reactants have been converted into one or more final, desired reaction products. In such alternative applications, a suitable ending condition will be provided instead of an ending time, and suitable changes will be made to the operation of the simulation from those which will be given here.

In step 4, the programmed state variable PV (e.g., temperature), which is a function of the IV, is input. Since the simulation will be run in terms of steps through the IV interval, the simulation is initialized by starting with the initial IV value $t_b$ (step 6). Step 6 additionally initializes the simulation by setting initial quantities of reactants, and making any other suitable initial conditions.

What follows is a sequence of steps, which is repeated iteratively during the course of the simulation. In step 8, the one or more dependent state variables DV (e.g., reaction rates) are calculated, as functions of the PV value (temperature) for the current value of the IV (time). Given these, a time step is calculated stochastically in step 10, such as by summing the individual reaction probabilities to give a total reaction rate, and using its reciprocal to calculate a time step. See equation (2). In step 12, the current IV value (current time) is updated by adding the stochastically calculated time step. In step 13, an event (i.e., one of the possible chemical reactions) is selected in accordance with conventional stochastic simulation, and the simulation is updated accordingly. Then, a test is made, in step 14, to determine whether the end of the IV interval (the ending time $t_e$) has been reached. If not, the iterative part of the process, starting at step 8, is repeated. If so, the simulation is completed (step 16).

As described above, however, if low reaction probabilities result in a large time step (step 10), it is possible that fine control of the simulation might be lost. See, for example, FIGS. 2 and 3, which are graphs showing the results of a conventional stochastic simulation of a chemical reaction involving dissociation and desorption of CO on a single crystal tungsten surface. Below about 300° K., the CO is bonded to the surface in an upright configuration, designated a-CO. At around 300° K., about half of the a-CO desorbs, and the other half dissociates to two groups of C and O atoms on the surface, designated db-CO and b-CO, respectively. This layer is static until about 800° K., when the db-CO starts to desorb. Above 1000° K., b-CO desorption takes place.

Figure 2:
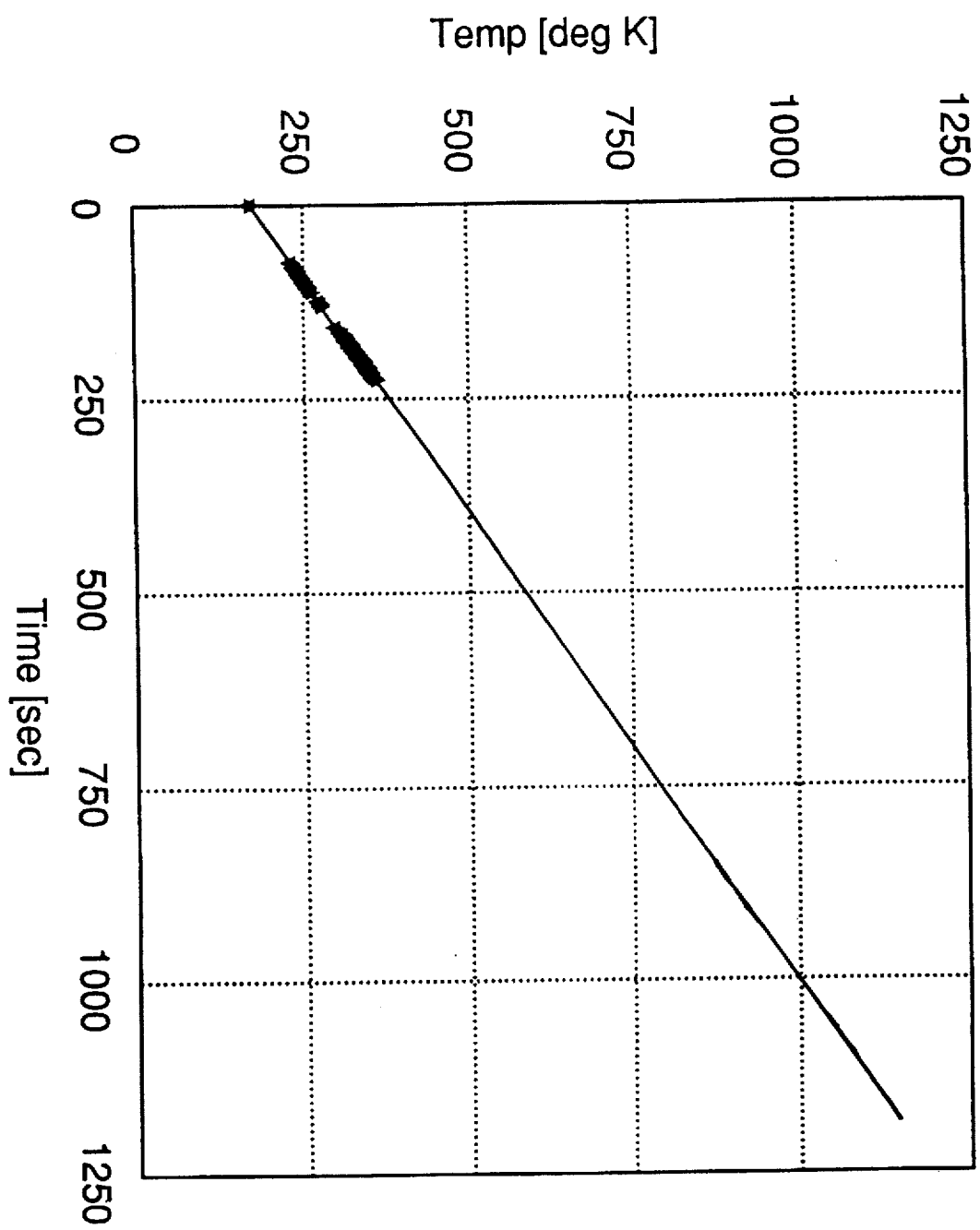
FIGS. 2 and 3 are graphs showing an exemplary reaction rate as a function of temperature during a conventional simulation, and further showing stochastically determined time steps.
Figure 3:
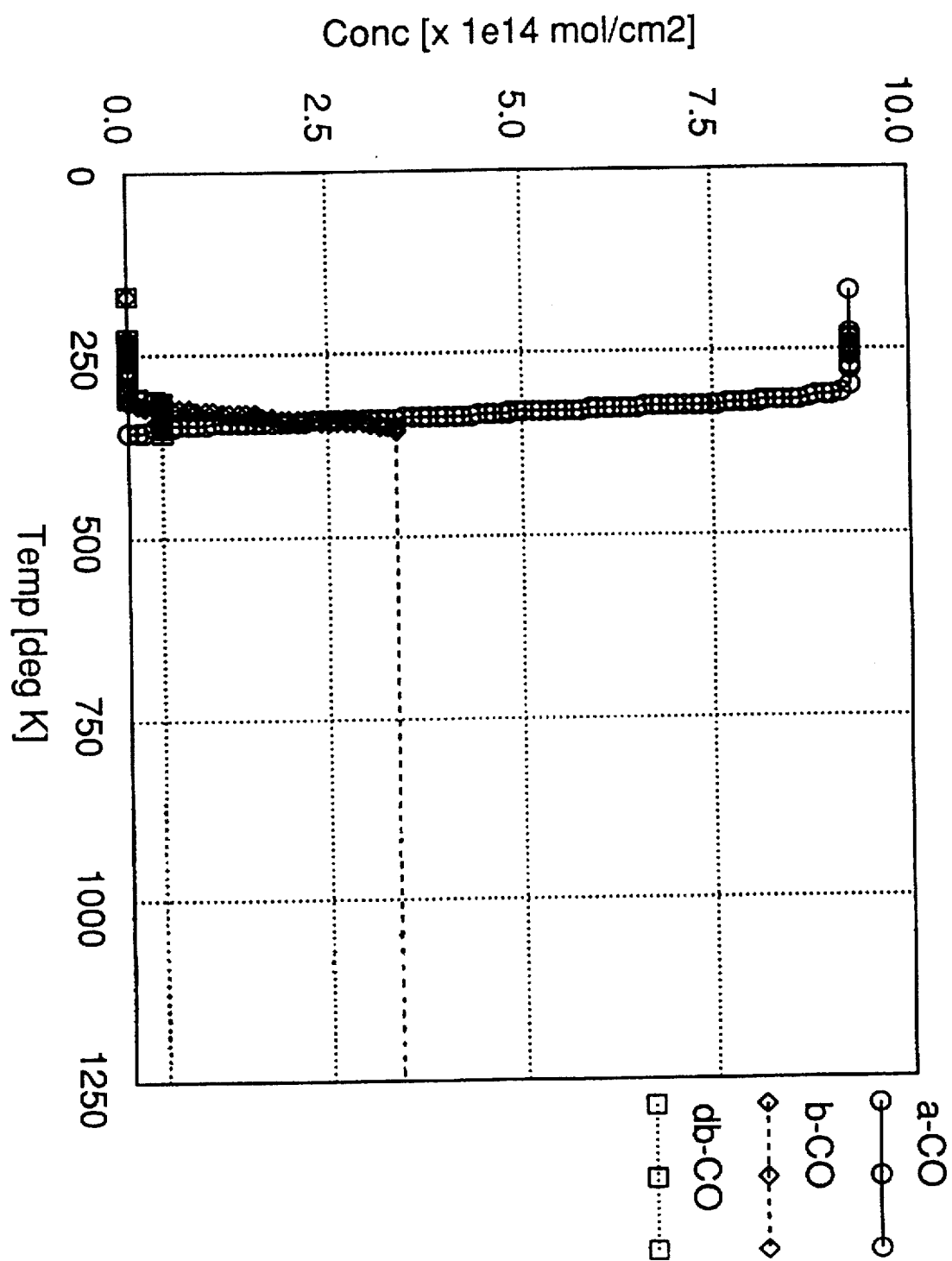

The graph of FIG. 2 illustrates that the programmed state variable, temperature, increases linearly from an initial value of 200° K. at time $t_b$=0 to a final value of 1150° K. at time $t_e$=1250 seconds. FIG. 3 is a graph of the quantities of the reactants as a function of temperature, over the same time interval as that of FIG. 2. Since temperature increases linearly with time (as shown in FIG. 2), FIG. 3 can also be understood as a graph of reactant quantities as a function of time.

It will be understood that the reaction rate is great when the quantities of reactants change drastically over a small change in temperature (for instance, the a-CO desorption and dissociation to db-CO and b-CO between 300° and 400° K.), and that the reaction rate is small when the quantities of reactants remain essentially constant over a range of temperatures (for instance, between 400° and 800° K.).

The curves on FIG. 3, which represent the quantities of the species, are marked with circles, diamonds, and squares, respectively, at points in the simulation corresponding with time steps, where simulated events took place, and the system state was updated. The temperature graph of FIG. 2 is similarly marked with Xs at the time steps. It will be noted that, during the intervals of high chemical activity (i.e., high reaction probability) such as that noted above, the time steps are so close together that they overlap each other on the graphs. On the other hand, where the reaction probability is low, lengthy sections of the graphs show no time steps at all.

From around 400° K. to around 800° K., there is essentially no chemical activity. As a consequence, the reactant quantities (FIG. 3) remain constant over this temperature interval. At the time of the final stochastic time step of the cluster of steps dealing with the dissociation and desorption of a-CO, the calculations made in step 10 resulted in a very long time step. Thus, the simulation did not select an event or update its status for the remainder of the temperature (i.e., time) domain covered by the graph. Accordingly, this conventional simulation would have failed to simulate the desorption of db-CO or b-CO. This failure to simulate these desorption reactions represents the disadvantageous loss of simulation control which can occur using a pure stochastic simulation.

Figure 4:
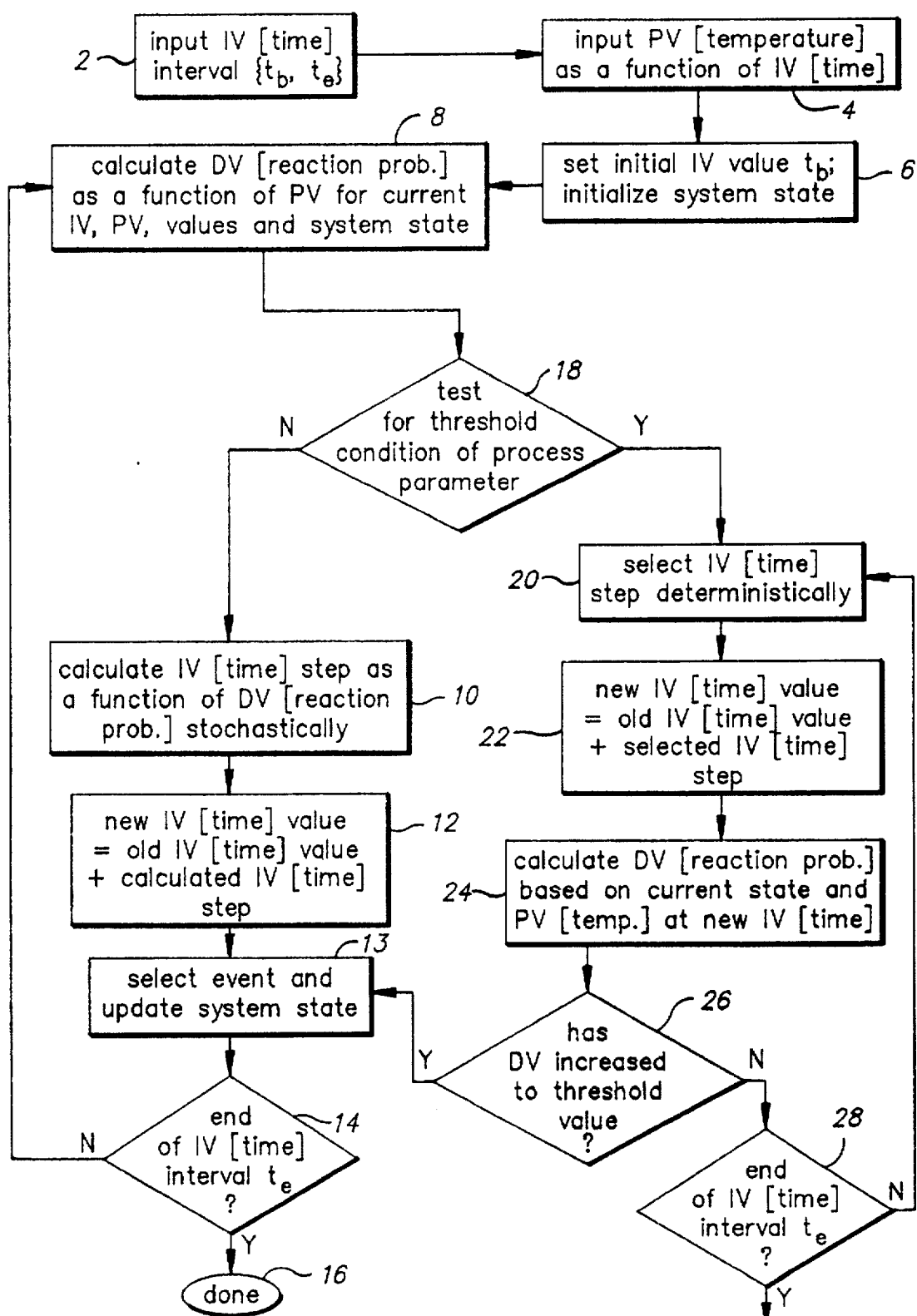
FIG. 4 is a flowchart of a simulation process employing a stochastic simulation method in accordance with the invention.

To overcome this drawback, in accordance with the invention, the simulation process is modified as shown in FIG. 4. As part of the iterated portion of the process, a test is added (step 18), following the calculation of the DV (reaction probabilities) in step 8. The test is made in terms of a "process parameter." The process parameter may be any parameter suitable for the particular type of process being simulated. Suitability is established, based on whether the test detects that the dependent variable or variables are changing in a way that would threaten to distort the simulation or cause control to be lost. The exact nature of this test varies, depending on the particular type of process that is being simulated. In the preferred example, since the time step is stochastically calculated from the reciprocal of the total reaction rate, that total reaction rate, or its reciprocal, may be used as the process parameter. It is then compared with a suitably chosen threshold value to perform the test of step 18.

Alternatively, the process parameter could be a largest single one of multiple reaction rates, or some other function of the reaction probabilities, such as a weighted sum, an average, etc. Again, the particular formula used to obtain the "process parameter" from the dependent state variable values, or from other factors, would depend on the particular type of process being simulated.

In the exemplary chemical reaction, a threshold value is determined for the sum of the reaction rates. If the sum of the rates is above the threshold value, it is established that the time step will be small enough to satisfy a user-defined criterion for maintaining control of the reaction. That is, it is established that a stochastically determined time step will be short enough that it is unlikely that any events important for obtaining accurate simulation results will be distorted or skipped over. In such a case, the result of the test in step 18 causes the simulation to go to step 10, and calculate a time step stochastically in the same manner as the conventional method. Afterward, step 12 updates the current time value by the time step, and step 13 selects an event and updates the system state, as described above.

However, if the sum falls within the threshold value, there is a low probability of any reaction taking place, and a stochastically determined time step would be large enough that a significant risk of loss of simulation control exists. In such a case, in accordance with the invention, the process is, in effect, "halted" at the current time. A deterministic time step is made, and the reaction probabilities are re-calculated, based on the system state, as it currently is, and on the programmed variable (temperature) value following the deterministic time step.

In subsequent iterations of the simulation, the system "inches" its way forward in time, watching for a future time at which the change in value of the programmed variable results in an increase in the reaction probabilities. This increase, which would require shorter stochastic time steps, is the sort of increase that is likely to be skipped over in the conventional, pure stochastic, simulation. However, in accordance with the invention, time is advanced, by these deterministic time steps, only up to the point where the increase in probability is detected At that time, a new event is selected and the system is updated, based on the probabilities at this point in time. Thereafter, the simulation proceeds stochastically, until any later point at which the reaction probability again falls low enough that the simulation again suspends and searches for a future increase in probability.

It will be understood that, because reaction probabilities can vary by many orders of magnitude for slight temperature changes, in a stochastic simulation the time steps can vary literally from nanoseconds to centuries. Therefore, the invention preferably employs deterministic time steps which are much smaller, even orders of magnitude smaller, than the stochastic time step would be.

Referring again to FIG. 4, when step 18 detects that the reaction probability meets the threshold condition, i.e., is sufficiently low to meet the user-defined threshold condition, processing proceeds to step 20, in which a time step is selected deterministically. The deterministic time step is preferably a step which limits the programmed variable (temperature) to some maximum change in value. For simulations in which temperature increases linearly with time, the time step can be a fixed time interval.

In step 22, the time step is added to the current time. It is to be noted that, preferably, the process being simulated remains suspended at the time at which the low probability was detected (step 18), and the system state (reactant concentrations, etc.) remain constant. However, for purposes of checking for future changes in probability, time moves forward, and the programmed state variable value (temperature) changes accordingly. Thus, the reaction probability calculations are made based on a present system state, in terms of factors such as the concentrations of the species, and on programmed variable values for a point in time in the increasingly distant future of the simulation.

In step 24, the reaction probabilities are re-calculated, based on the current system state and the temperature to be encountered at the future time produced in step 22. In step 26, a test is made to determine whether the reaction probability, as calculated in step 24, has increased above a second threshold value to indicate that chemical activity is resuming. If so, then processing proceeds to step 13, an event is selected according to stochastic procedures, and the system is updated. Thereafter, processing proceeds normally (steps 8 through 14).

If not, the simulator moves on to step 28, to again test for the end of the simulation period, or to begin another iteration, in a manner similar to that of step 14. Again, it will be understood that step 28 could alternatively test for a condition in which only the final reaction products are left. In this example, this would be a test for whether all of the db-CO and b-CO has desorbed.

However, if step 28 indicates that the end of the simulation period has not been reached yet, the method preferably avoids an unnecessary repetition of the step 18 test, and performs another iteration of the sequence of steps 20–26. Again, step 20 selects the next time step deterministically. If the deterministic time step is selected as a fixed length time step, then the same length step is used as with the previous iteration of setps 20–26. Since, in the illustrated example, temperature increases linearly with time, a time step causing a fixed temperature increase is again the same length of time as the previous iteration. If the temperature were increasing at an increasing rate per unit of time, then a smaller deterministic time step would be made to provide a fixed temperature increase.

As a theoretical limitation, a deterministically selected time step should not exceed that which would be calculated if the process parameter had the threshold value for the step 18 test, because the advantage of the invention in providing increased control of the simulation will be lost if the deterministic time step is equal to or greater than the stochastic time step would be. In practice, the deterministic step will probably be orders of magnitude smaller than the stochastically calculated time step for the threshold probability value.

Figure 5:
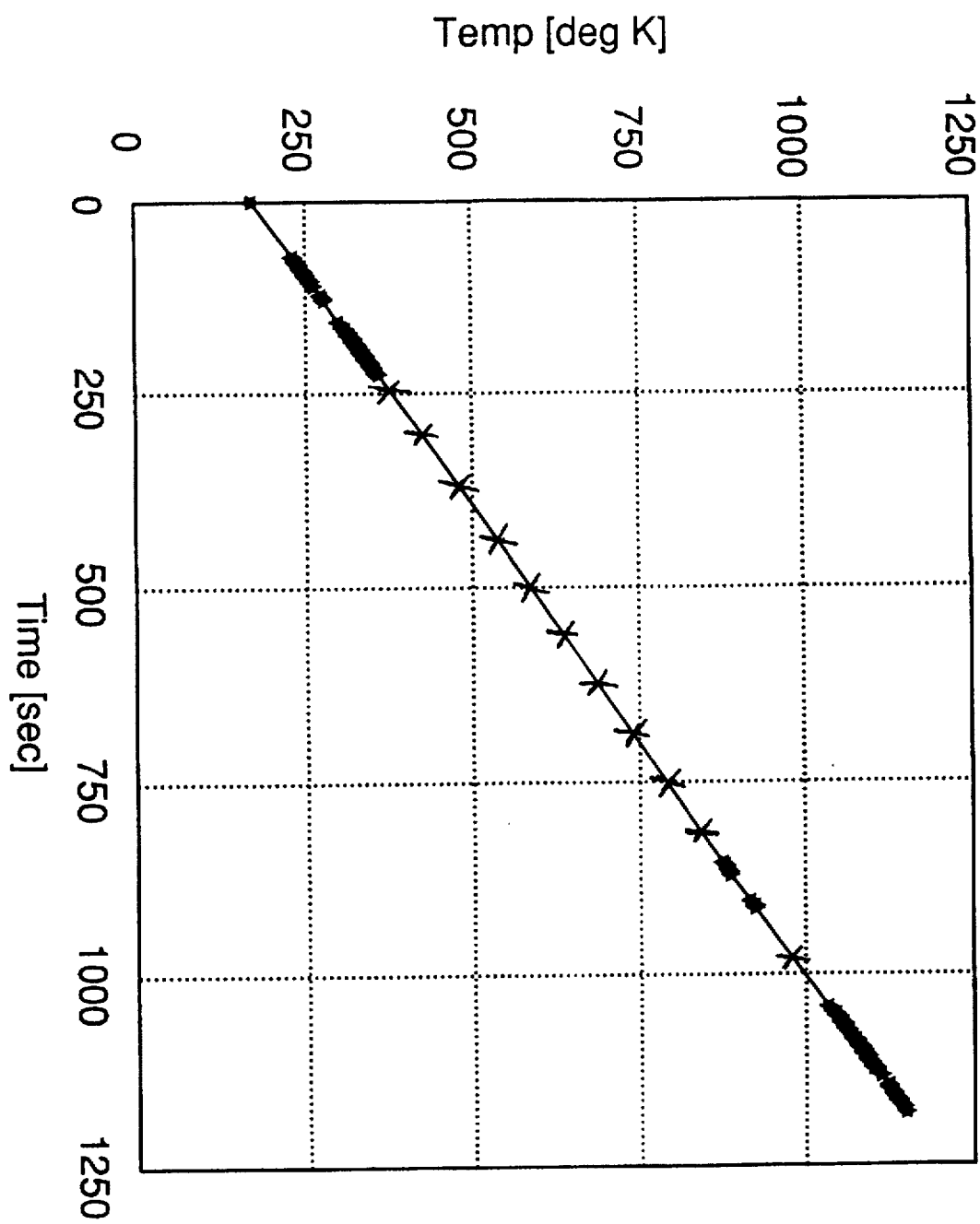
FIGS. 5 and 6 are graphs, similar to those of FIGS. 2 and 3, respectively, showing an exemplary reaction rate as a function of temperature during a simulation in accordance with the invention, and further showing deterministically selected time steps.
Figure 6:
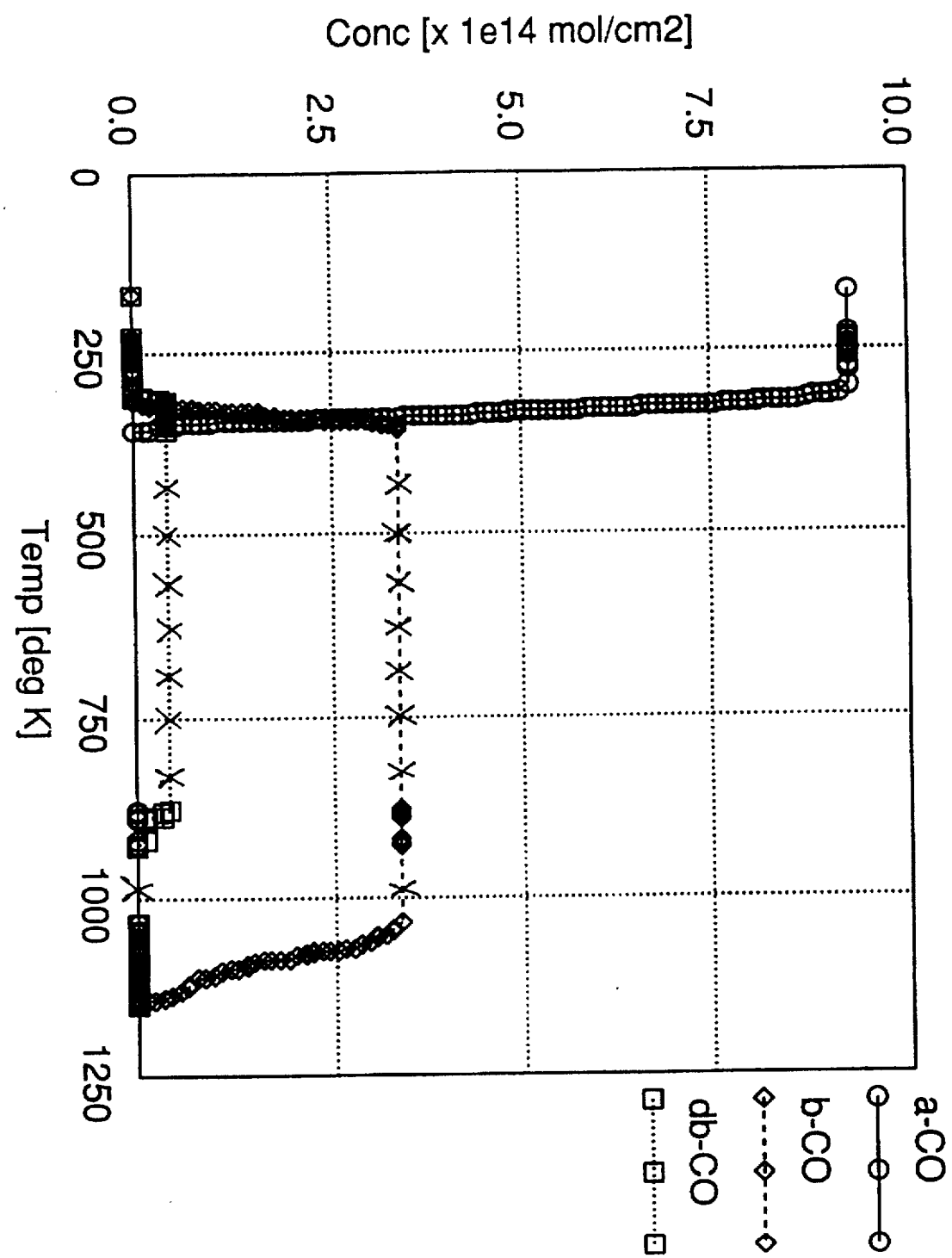

An example of a graph for a simulation process in accordance with the invention is given in FIGS. 5 and 6. FIGS. 5 and 6 show the same temperature/time and reactant quantity/temperature curves for the same simulation as FIGS. 2 and 3, except that deterministic time steps, in accordance with the invention, are added. For illustrative purposes, the deterministic time steps are placed at intervals of 50 seconds, corresponding with 40 degrees of temperature increase. Thus, by comparing FIGS. 2–3 and 5–6, it will be seen that, for this simulation of a linearly increasing temperature, the deterministic time steps are placed at constant intervals, and occur during the interval which, in FIGS. 2–3, no time steps are made because of the low probability of reactions calculated stochastically as of the beginning of the interval. Thus, any increase in chemical activity which occurs during the interval will be detected by the test of step 26, when the deterministic time steps reach the time or temperature at which that increase in activity takes place.

Again, it will be understood that, for illustrative purposes, a fixed deterministic time step was chosen which would be easily visible in FIGS. 5–6. However, it will be understood that the deterministic time steps used in a realistic simulation may be small enough to not be clearly distinguishable on a graph to the scale of the drawings with the present specification. The deterministic time step is to be set in accordance with the specific details of the simulation to be run, and it is foreseen that the deterministic time step will generally be orders of magnitude smaller than the largest stochastically calculated time step.

While the preferred embodiments of the present invention have been illustrated in detail, it should be apparent that modifications and adaptations to those embodiments may occur to one skill in the art without departing from the scope of the present invention as set forth in the following claims.

What is claimed is:

1. A method for operating a computer system to perform stochastic simulation of a chemical kinetic process over a time domain in terms of a sequence of time values, within the time domain, the chemical kinetic process operating over a range of values for a programed state variable which is a predetermined function of time, the chemical kinetic process including a dependent state variable which is a function of the programmed state variable, the method comprising the computer-implemented steps of:

calculating a value for a process parameter, the step of calculating including calculating a state of the chemical kinetic process, given in terms of a current value of the dependent state variable, based on a current value of the programmed state variable for a current time value;

selecting a time value to be a value of the sequence based on a first selection technique where the process parameter has a value within a range of values; and selecting a time value to be a value of the sequence based on a second selection technique where the process parameter has a value outside the range of values; and repeating the steps of calculating, selecting based on a first technique, and selecting based on a second technique, until a predetermined condition representative of a conclusion of the chemical kinetic process is reached.

2. A method as recited in claim 1, wherein the process includes at least one chemical reaction, the dependent state variable includes at least one reaction rate for the at least one chemical reaction, and the step of calculating includes calculating the at least one reaction rate as a function of the current value of the programmed state variable.

3. A method as recited in claim 2, wherein the step of calculating a value for a process parameter includes calculating the value as being related to the respective current values of the at least one dependent state variables.

4. A method as recited in claim 3, wherein the process parameter is a greatest one of the respective current values of the at least one dependent state variable.

5. A method as recited in claim 3, wherein the process parameter is a sum of the respective current values of the at least one dependent state variable.

6. A method as recited in claim 3, wherein the step of selecting according to a first technique includes adding a value related to the value of the process parameter to the current value of the independent state variable.

7. A method as recited in claim 6, wherein:
the independent state variable is time;
the process parameter is a value related to the at least one reaction rate; and
the step of adding includes adding a time step value related to the reciprocal of the process parameter to the current value of the independent state variable.

8. A method as recited in claim 3, wherein the step of selecting according to a second technique includes adding a deterministically set value to the current value of the independent state variable.

9. A method as recited in claim 8, wherein the step of selecting according to a second technique includes adding, to the current value of the independent state variable, one of:
(i) a value having a fixed value; and
(ii) a value corresponding with a change of value of the programmed state variable within a maximum change thereof.

10. A data processing apparatus for performing stochastic simulation of a chemical kinetic process over a time domain in terms of a sequence of time values, within the time domain, the chemical kinetic process operating over a range of values for a programmed state variable which is a predetermined function of time, the chemical kinetic process including a dependent state variable which is a function of the programmed state variable, the apparatus comprising:

means for calculating a value for a process parameter, the means for calculating a process parameter includes means for calculating a state of the chemical kinetic process, given in terms of a current value of the dependent state variable, based on a current value of the programmed state variable for a current time value;

means for selecting a time value to be a value of the sequence based on a first selection technique where the process parameter has a value within a range of values;

means for selecting a time value to be a value of the sequence based on a second selection technique where the process parameter has a value outside the range of values; and means for repeating operation of the means for calculating, the means for selecting based on a first technique, and the means for selecting based on a second technique, until a predetermined condition representative of a conclusion of the chemical kinetic process is reached.

11. An apparatus as recited in claim 10, wherein the process includes at least one chemical reaction, the dependent state variable includes at least one reaction rate for the at least one chemical reaction, and the means for calculating includes means for calculating the at least one reaction rate as a function of the current value of the programmed state variable.

12. An apparatus as recited in claim 11, wherein the means for calculating a value for a process parameter includes means for calculating the value as being related to the respective current values of the at least one dependent state variables.

13. An apparatus as recited in claim 12, wherein the process parameter is a greatest one of the respective current values of the at least one dependent state variable.

14. An apparatus as recited in claim 12, wherein the process parameter is a sum of the respective current values of the at least one dependent state variable.

15. An apparatus as recited in claim 12, wherein the means for selecting according to a first technique includes means for adding a value related to the value of the process parameter to the current value of the independent state variable.

16. An apparatus as recited in claim 16, wherein:
the independent state variable is time;
the process parameter is a value related to the at least one reaction rate; and
the means for adding includes means for adding a time step value related to the reciprocal of the process parameter to the current value of the independent state variable.

17. An apparatus as recited in claim 12, wherein the means for selecting according to a second technique includes means for adding a deterministically set value to the current value of the independent state variable.

18. An apparatus as recited in claim 17, wherein the means for selecting according to a second technique includes means for adding, to the current value of the independent state variable, one of:
(i) a value having a fixed value; and
(ii) a value corresponding with a change of value of the programmed state variable within a maximum change thereof.

19. A computer program product, for use with a processing system, for performing stochastic simulation of a chemical kinetic process over a time domain of values for an independent state variable in terms of a sequence of time values, within the time domain, for the independent state variable, the chemical kinetic process operates over a range of values for a programmed state variable which is a predetermined function of time, the chemical kinetic process includes a dependent state variable which is a function of the programmed state variable, the computer program product comprising:

a recording medium;

means, recorded on the recording medium, for directing the processing system to calculate a value for a process parameter, the means for directing to calculate a process parameter includes means, recorded on the recording medium, for directing the processing system to calculate a state of the chemical kinetic process, given in terms of a current value of the dependent state variable, based on a current value of the programmed state variable for a current time value;

means, recorded on the recording medium, for directing the processing system to select a time value of the independent state variable domain to be a value of the sequence based on a first selection technique where the process parameter has a value within a range of values; and means, recorded on the recording medium, for directing the processing system to select a time value of the independent state variable domain to be a value of the sequence based on a second selection technique where the process parameter has a value outside the range of values; and means, recorded on the recording medium, for directing the processing system to repeat operation of the means for directing to calculate, the means for directing to select based on a first technique, and the means for directing to select based on a second technique, until a predetermined condition representative of a conclusion of the chemical kinetic process is reached.

20. A computer program product as recited in claim 19, wherein the process includes at least one chemical reaction, the dependent state variable includes at least one reaction rate for the at least one chemical reaction, and the means for directing to calculate includes means, recorded on the recording medium, for directing the processing system to calculate the at least one reaction rate as a function of the current value of the programmed state variable.

21. A computer program product as recited in claim 20, wherein the means for directing to calculate a value for a process parameter includes means, recorded on the recording medium, for directing the processing system to calculate the value as being related to the respective current values of the at least one dependent state variables.

22. A computer program product as recited in claim 21, wherein the process parameter is a greatest one of the respective current values of the at least one dependent state variable.

23. A computer program product as recited in claim 21, wherein the process parameter is a sum of the respective current values of the at least one dependent state variable.

24. A computer program product as recited in claim 21, wherein the means for directing to select according to a first technique includes means, recorded on the recording medium, for directing the processing system to add a value related to the value of the process parameter to the current value of the independent state variable.

25. A computer program product as recited in claim 24, wherein:

the independent state variable is time;

the process parameter is a value related to the at least one reaction rate; and the means for directing to add includes means, recorded on the recording medium, for directing the processing system to add a time step value related to the reciprocal of the process parameter to the current value of the independent state variable.

26. A computer program product as recited in claim 21, wherein the means for directing to select according to a second technique includes means, recorded on the recording medium, for directing the processing system to add a deterministically set value to the current value of the independent state variable.

27. A computer program product as recited in claim 26, wherein the means for directing to select according to a second technique includes means, recorded on the recording medium, for directing the processing system to add, to the current value of the independent state variable, one of:

(i) a value having a fixed value; and (ii) a value corresponding with a change of value of the programmed state variable within a maximum change thereof.

28. A method as recited in claim 1, wherein the step of selecting a time value to be a value of the sequence based on a first selection technique, includes selecting the time value using a stochastic technique.

29. An apparatus as recited in claim 10, wherein the means for selecting a time value to be a value of the sequence based on a first selection technique, includes means for selecting the time value using a stochastic technique.

30. A computer program product as recited in claim 19, wherein the means for directing to select a time value to be a value of the sequence based on a first selection technique, includes means, recorded on the recording medium, for directing the processing system to select the time value using a stochastic technique.

* * * * *